United States Patent [19]

Turner et al.

[11] 4,323,198

[45] Apr. 6, 1982

[54] METHOD FOR FRACTURING SILICON-CARBIDE COATINGS ON NUCLEAR-FUEL PARTICLES

[75] Inventors: Lloyd J. Turner, Oak Ridge; Melvin G. Willey, Knoxville; Sue M. Tiegs, Lenoir City; John E. Van Cleve, Jr., Kingston, all of Tenn.

[73] Assignee: The United States of America as represented by the United States Department of Energy, Washington, D.C.

[21] Appl. No.: 191,613

[22] Filed: Sep. 29, 1980

Related U.S. Application Data

[62] Division of Ser. No. 70,365, Aug. 28, 1979, abandoned.

[51] Int. Cl.$^3$ ............................................. B02C 19/12
[52] U.S. Cl. ...................................... 241/5; 241/24; 241/40; 241/79.1
[58] Field of Search ...................... 241/5, 40, 24, 79.1

[56] References Cited

U.S. PATENT DOCUMENTS 2,103,453 12/1937 Graemiger ............................ 241/40
2,768,938 10/1956 Martin ............................. 241/40 X
3,184,169  5/1965 Friedman et al. .................... 241/40

*Primary Examiner*—Mark Rosenbaum
*Attorney, Agent, or Firm*—Fred O. Lewis; Stephen D. Hamel; Richard G. Besha

[57] ABSTRACT

This invention is a device for fracturing particles. It is designed especially for use in "hot cells" designed for the handling of radioactive materials. In a typical application, the device is used to fracture a hard silicon-carbide coating present on carbon-matrix microspheres containing nuclear-fuel material, such as uranium or thorium compounds. To promote remote control and facilitate maintenance, the particle breaker is pneumatically operated and contains no moving parts. It includes means for serially entraining the entrained particles on an anvil housed in a leak-tight chamber. The flow rate of the gas is at a value effecting fracture of the particles; preferably, it is at a value fracturing them into product particulates of fluidizable size. The chamber is provided with an outlet passage whose cross-sectional area decreases in the direction away from the chamber. The outlet is connected tangentially to a vertically oriented vortex-flow separator for recovering the product particulates entrained in the gas outflow from the chamber. The invention can be used on a batch or continuous basis to fracture the silicon-carbide coatings on virtually all of the particles fed thereto.

4 Claims, 5 Drawing Figures

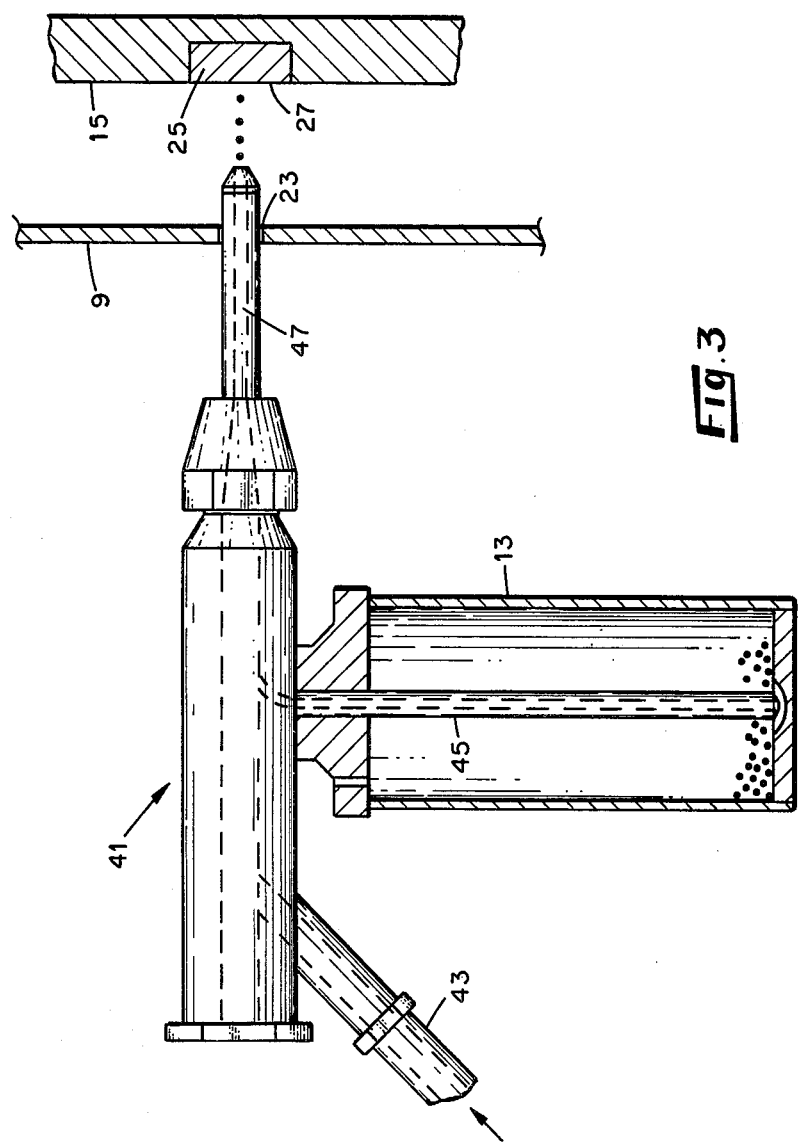

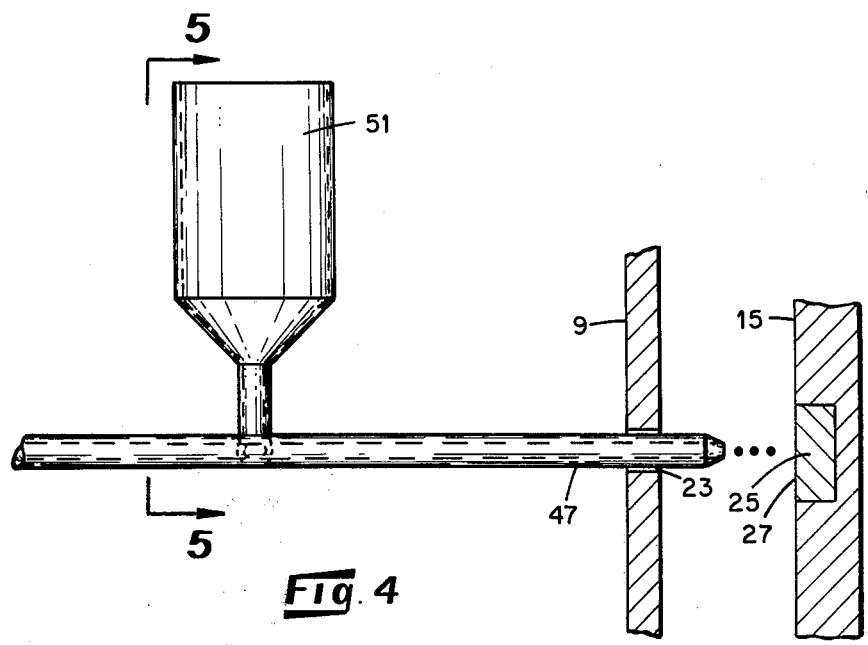
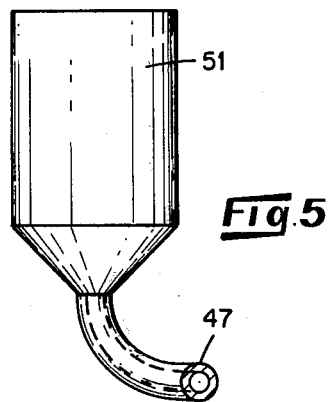

METHOD FOR FRACTURING SILICON-CARBIDE COATINGS ON NUCLEAR-FUEL PARTICLES

The invention is a result of a contract with the U.S. Department of Energy.

This is a division, of application Ser. No. 70,365, filed Aug. 28, 1979, now abandoned.

BACKGROUND OF THE INVENTION

1. Field of the Invention

This invention relates broadly to methods for fracturing particles. More particularly, it relates to methods for fracturing particles by impelling them against a hard surface.

2. Problem

A nuclear reactor of the kind designated as a high-temperature, gas-cooled reactor (HTGR) utilizes millions of fuel rods in the form of small cylinders. As disclosed in U.S. Pat. No. 3,901,409 (Bradley et al, issued Aug. 26, 1975) the typical cylinder contains many microspherical particles, including fissile particles. The fissile particles are virtually identical, each consisting of an enriched-uranium oxycarbide microsphere having the following coatings (listed in order from the innermost to outermost): a porous carbon coating, a non-porous isotropic carbon coating, a non-porous silicon carbide (SiC) coating, and another non-porous isotropic carbon coating. The fuel-rod particles are carefully inspected at each stage of their manufacture to determine if they meet specifications with respect to size, shape, density, integrity of the coatings, etc. Particles which fail to meet the specifications are rejected as scrap, and usually it is desirable to process the scrap fissile particles to recover the valuable uranium core, or kernel. A proposed process for such recovery comprises burning off the exterior carbon coating; mechanically fracturing the now-exposed refractory SiC coating; processing the resulting material in a fluidized-bed burner to burn off carbon and convert the uranium oxycarbide to easily leached $U_3O_8$; and recovering the enriched uranium by acid-leaching.

In connection with the above-described recovery process, an investigation was conducted to find a suitable method and device for mechanically fracturing the SiC coatings. An important specification for the method was that it should fracture the SiC coatings on virtually all of the feed particles, so as to permit recovery by leaching of at least 98 wt-% of the uranium contained in the particle feed. Another important specification was that the fragments from the fracturing operation be sufficiently coarse to be fluidizable in standard fluid-bed burners. A third important specification was that the device should permit long-term use in a "hot cell," where floor space is at a premium and where adjustments and maintenance must be conducted with manipulators. This dictated that the fracturing device should be simple, reliable, compact, and composed of a minimum of moving parts. Preferably, the method would break the SiC coating but minimize breakage of the uranium-containing core of the particles, since fine particles are difficult to fluidize.

Prior Art

A commercially available "centrifugal-impact crusher" includes a spinning disc for slinging particles against anvils positioned outwardly on the rim of the disc. A relatively large (7.5 hp) electric motor rotates the disc at speeds up to 20,000 rpm. As the disc is rotated, particles contained in a central depression in the disc are slung outward through internal radially extending passages. This crusher was considered unsuitable for hot-cell applications because it requires frequent maintenance and is relatively bulky. Various other commercially available crushers (disc pulverizers, fluid-energy mills, etc.) are not suitable for the abovedescribed application because they grind material extremely fine.

A previously developed "jet grinder" was designed especially for breaking SiC-coated particles of the kind described. The grinder includes a column containing a vertical array of air jets and an opposed array of anvils. Particles to be broken are fed to the top of the column and fluidized with air introduced at the bottom. The jets impact the fluidized particles against the anvils. Unfortunately, this device does not provide close control of the inertia of the particles impinged against the anvils. That is, the inertia given to a particle by a jet often is reduced to an unpredictable and significant degree by collisions with other fluidized particles.

A previously developed "roll crusher" was designed to break SiC-coated particles of the kind described. The crusher comprised an electric motor and two gear-driven rollers separated by a fixed spacing. The particles to be broken were fed to the rollers by gravity. The spacing between the rollers could be changed by substituting rollers of a different diameter. That type of crusher is not well adapted for hot-cell applications because the gap between the rollers increases with use and because the mechanism requires frequent maintenance.

OBJECTS OF THE INVENTION

Accordingly, it is an object of this invention to provide a novel method for fracturing particles having a relatively hard external coating, the resulting particulates being of fluidizable size.

It is another object to provide a method for fracturing particles by impaction, the particles having essentially equal inertia when impacted.

It is another object to provide a particle-fracturing method which can be conducted in apparatus having no moving parts and in which the impact inertia of the particles to be fractured can be adjusted remotely, with relative ease.

Other objects, advantages and novel features will become apparent from the drawings and the following description.

This method is directed to effecting the removal of silicon-carbide coatings, or shells, from particles which also include a carbon core. The method comprises providing a chamber having an impaction surface. A stream of carrier gas in which the particles to broken are serially entrained is introduced to the chamber and impinged against the impaction surface, the volumetric flow rate of the gas being kept at substantially the minimum value effecting fragmentation of the silicon-carbide coating. The resulting stream containing particulates is directed through a velocity-increasing channel of gradually decreasing cross-sectional area and then introduced tangentially to a vortex-flow separator for removing entrained particulates therefrom.

BRIEF DESCRIPTION OF THE DRAWINGS

FIG. 3 is a schematic diagram illustrating an arrangement for serially entraining particles in a carrier gas and impinging them on an anvil 25, FIG. 4 is a schematic diagram of an alternative to the arrangement shown in FIG. 3, and FIG. 5 is another view of a gravity-type dispenser 51 shown in FIG. 4.

DESCRIPTION OF THE PREFERRED EMBODIMENT

This invention is applicable generally to the breaking of particles of various kinds, but for brevity it will be described below as designed for breaking the silicon-carbide coating on fissile particles of the kind described above. In this particular application the objective was to crack or fragment the silicon carbide coating while generating particulates of a size permitting fluidization in conventional fluid-bed burners. The generation of many fine particulates (e.g., particulates below about $50\mu$) was to be avoided, since these tend to plug filters and to make material-transfer operations more difficult.

Figure 1:
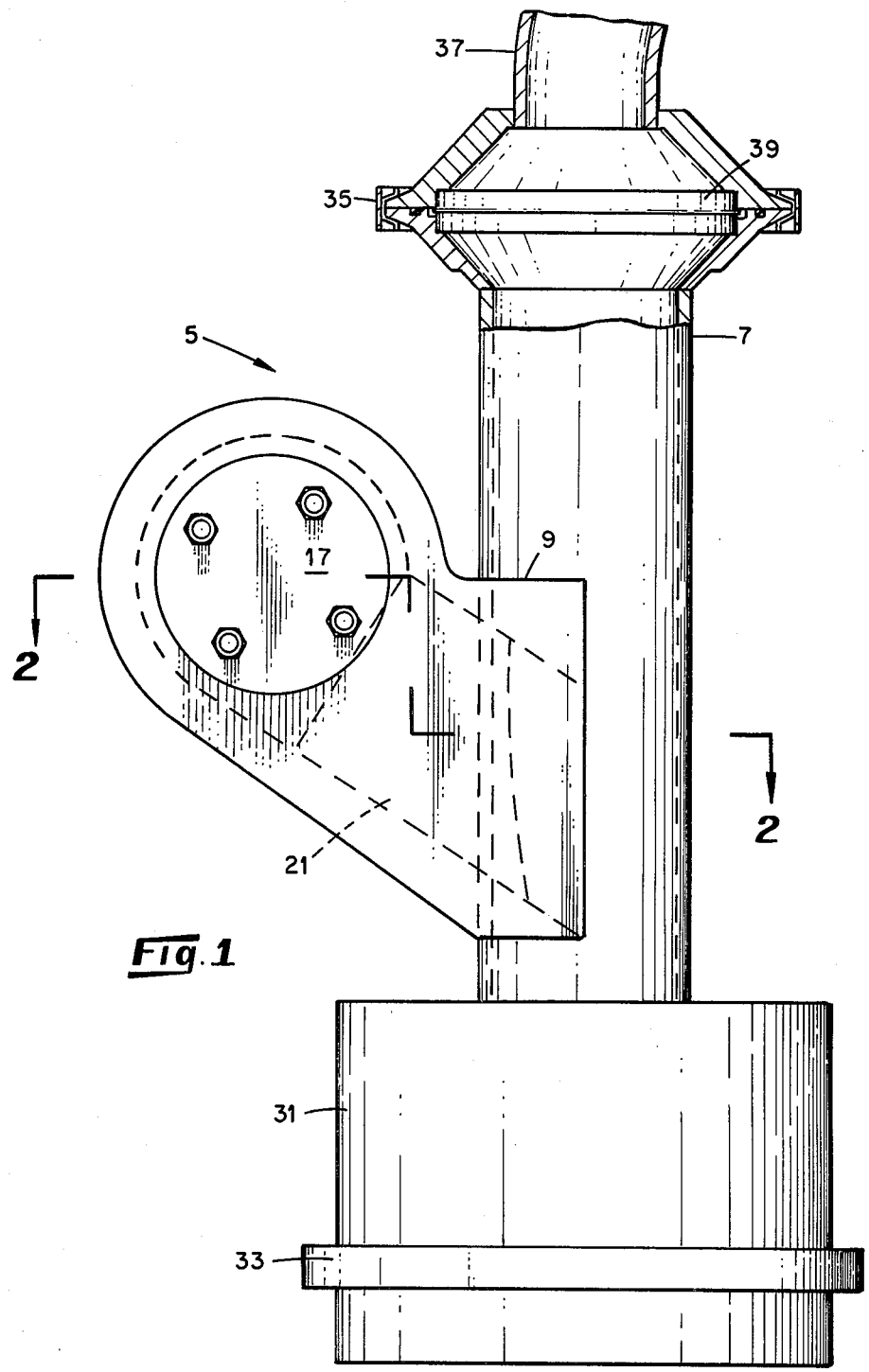
FIG. 1 is a side view, partly in section, of a device designed to carry out this invention.
Figure 2:
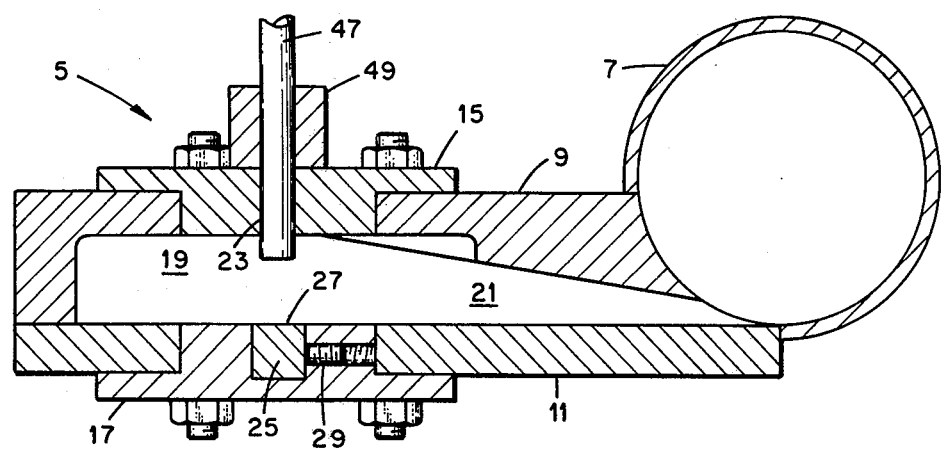
FIG. 2 is a cross-sectional view taken along line 2—2 of FIG. 1.

Referring to FIGS. 1 and 2, a device for carrying out the invention includes a leak-tight assembly comprising a housing 5 and a vertically extending cylinder 7. The housing is a bolted assembly of two plates 9 and 11, which carry flanged inserts 15 and 17, respectively. The plates define a generally circular particle-breaking chamber 19 and an outlet passage 21 therefor. The passage 21 is of rectangular cross section; its width and thus cross-sectional area decreases continuously in the direction away from the chamber. As indicated in FIG. 1, the passage slopes downward from the chamber. The exit end of passage 21 connects tangentially to a medial section of the cylinder 7. The insert 15 is formed with a straight, throughgoing bore 23 constituting an inlet-passage for the chamber 19. As shown, the insert 17 carries a tungsten-carbide anvil 25 having a surface 27 which confronts the inner end of passage 23 and extends normal to the axis thereof. The anvil is removably fixed to insert 17 by a set screw 29.

Referring to FIG. 1, the cylinder 7 serves as a vortex separator, meaning a device (such as a standard cyclone separator) which utilizes vortex flow to effect the removal of entrained particulates from a carrier gas. The lower end 31 of the cylinder serves as a hopper for collecting particulates settling by gravity. The bottom of the hopper is removable, being connected to the cylinder by means of a standard V-band 33. The top of the cylinder is connected, by means of a similar band 35, to a line 37 for venting gas; if desired, this line may contain a cyclone separator and filters (not shown) for trapping fines. As shown, the upper end of the cylinder is bridged by a sieve 39 for restricting outflow of gas-entrained particulates exceeding a selected size.

Referring to FIG. 3, the device includes means for serially entraining the silicon-coated fissile particles and impacting them against the anvil surface 27. In the illustrated embodiment this is effected with a conventional aspirator gun 41, having an inlet 43 for connection to a source (not shown) of any suitable carrier gas, such as argon. As shown, the suction lines 45 of the gun extends into a bed of the above-mentioned fissile particles and is sized for serial passage thereof. The particles are contained in a vented vessel 13, which is threaded to the base of the gun. The delivery tube 47 for the gun is secured to the housing by means of a split-ring clamp 49 (FIG. 2), one section of which is affixed to the insert 15. As shown in FIG. 2, the delivery tube extends through the clamp, the inlet-passage 23, and into the chamber 19. With the clamp loosened, the tube can be positioned axially to adjust the tube-to-anvil spacing.

In a typical operation of the illustrated embodiment, the vessel 13 is loaded with particles, and the carrier-gas flow rate is set at the minimum value effecting fracture of the SiC coatings on, say, 99% of the particles. The carrier gas impinges the serially entrained particles against the anvil 25 so that each particle receives a single impact, cracking the SiC coatings. The resulting particulates are entrained in the gas leaving the chamber through outlet 21. The outlet passage is tapered to increase the velocity of the outflowing gas, thus minimizing solids buildup in the passage and enhancing disentrainment of particulates in the vortex separator 7. The passage is downwardly inclined (FIG. 1) to promote the outflow of any particulates settling therein.

EXAMPLE

Particle-fracturing tests were conducted with a device similar to that shown in the figures, with the exception that the hopper 31 included a plurality of superimposed sieves (not shown) for separating the product particulates by size, thus permitting determination of the particle-size distribution. In one series of tests, three runs were conducted at different carrier-gas (argon) flow rates; in each run, approximately 100 grams of fissile particles was passed through the gun 41. The particles were similar to those described above, with the exception that the SiC coating was not coated with carbon, since in the typical uranium-recovery operation the outermost layer of carbon would be burned off prior to the fracturing operation (see above). The typical particle had a diameter of 590 $\mu$m and a weight of $3.43 \times 10^{-4}$ g. The typical SiC coating had a thickness of 33 $\mu$m. The suction line 45 for the gun 41 had an internal diameter of 0.104". The spacing between the delivery tube 47 and anvil 25 was 1.75". The input section of the cylinder 7 had an internal diameter of $5\frac{3}{4}$".

The above-mentioned three runs were conducted at argon flow rates to the aspirator of 8.50, 11.83, and 16.25 cfm, yielding uranium recoveries of 99 wt-%, 99.48 wt-%, and 98.41 wt-%, respectively. (The uranium was recovered by conventional nitric-acid leaching of all of the particulates collected in the hopper 31.) Thus, these runs met the aforementioned specification relating to fracturing the SiC coatings on nearly all of the particles. The run conducted at 16.25 cfm generated appreciably more dust than the other two runs. The operating time for each of the runs was about one minute. The particle-size distributions for the three lots of particulates produced in the runs indicated that all three lots could be fluidized without difficulty in conventional fluid-bed equipment. For instance, the particle-size distribution for the product from the run conducted at 11.83 cfm was as follows:

| Screen Size, $\mu$m | Weight (g) | Weight % |
| --- | --- | --- |
| +500 | 2.36 | 2.46 |
| −500 + 420 | 4.86 | 5.07 |
| −420 + 350 | 11.93 | 12.43 |
| −350 + 300 | 6.78 | 7.07 |
| −300 + 250 | 11.29 | 11.77 |
| −250 + 180 | 17.59 | 18.33 |
| −180 + 160 | 6.17 | 6.43 |
| −160 + 100 | 15.30 | 15.94 |
| −100 + 60 | 10.23 | 10.66 |
| −60 + 40 | 4.23 | 4.41 |

-continued

| Screen Size, μm | Weight (g) | Weight % |
|---|---|---|
| −40 | 5.21 | 5.43 |
| Total | 95.96 | 100.00 |

In a preliminary run conducted with the same device, simulated (nickel-core) feed particles, were used to avoid equipment contamination. The particulates recovered in the hopper 31 were examined microscopically. No particles having unbroken SiC coatings were found. This run was conducted at an argon pressure of 40 psi and an argon flow rate of 5.4 cfm.

The particle-fracturing method and device disclosed herein have several important advantages, including the following: (1) virtually all of the particles to be broken can be impinged on the anvil with equal inertia, permitting highly uniform fracture of the various particles; (2) the particles are impacted one-by-one, and only a single impact is required; (3) the inertia to be imparted to a given lot of particles can be pre-set easily from a remote station, merely by adjusting the flow rate of the carrier gas; (4) the device is of simple construction and is compact; (5) the device contains no moving parts. Thus, the invention is especially well-suited for hot-cell use.

The foregoing description of a preferred form of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated.

Preferably, the anvil surface 27 is composed of material having a hardness of at least 1400 kg/mm$^2$, Rockwell scale 90. The material may, for example, be boron carbide, tungsten carbide, or silicon carbide. The suction line and delivery tube for the aspirator 41 preferably are composed of a material which is highly resistant to abrasion, such as silicon carbide. The carrier gas may, for example, be argon, nitrogen, or atmospheric air. It will be apparent that various conventional means may be used to serially entrain the feed particles in the carrier gas. For instance, as indicated schematically in FIGS. 4 and 5, the particles may be introduced into the carrier stream one at a time by means of a conventional gravity-type particle dispenser 51. If desired, the product collector 7 may be a standard cyclone separator. Referring to FIG. 2, the inlet passage 23 to the chamber 19 may serve as a delivery tube for the particles to be broken.

It is intended that the scope of the invention be defined by the claims appended hereto.

What is claimed is:

1. In the art of processing particles, the improved method comprising:
   providing a chamber containing an impaction surface,
   introducing to said chamber and impinging on said surface a stream of carrier gas containing serially entrained similar spheroidal particles, each having a carbon core which contains nuclear-fuel material and has a silicon-carbide coating, said stream having a volumetric flow rate which is at substantially a minimum value effecting fragmentation of said coating by impingement on said surface, to generate a gas stream containing particulates resulting from said impingement,
   directing said gas stream containing particulates through a channel of gradually decreasing cross-sectional area to accelerate its rate of flow,
   providing a vortex-flow type of separator having an inlet, and
   tangentially introducing to said inlet the gas stream issuing from said channel to remove entrained particulates therefrom.

2. The method of claim 1 wherein said channel slopes downwardly toward said inlet.

3. In the art of processing particles, the improvement comprising:
   providing a chamber containing an impaction surface,
   impinging on said surface a stream of carrier gas containing similar spheroidal particles, each having a carbon core which contains nuclear-fuel material and has a silicon-carbide coating, said stream having a volumetric flow rate which is at substantially a minimum value effecting fragmentation of said coating by single impingement on said surface, to generate a gas stream containing particulates resulting from said impingement,
   directing said gas stream containing particulates through a channel of gradually decreasing cross-sectional area to accelerate its rate of flow,
   and directing the gas stream issuing from said channel into a vortex-flow separator to provide a product mainly comprising intact carbon cores and fragments of said coating.

4. The method of claim 3 further characterized by said surface having a hardness of at least 1400 kg/mm$^2$, Rockwell scale 90.

* * * * *